(12) United States Patent
Takashima

(10) Patent No.: US 8,774,292 B2
(45) Date of Patent: Jul. 8, 2014

(54) DATA TRANSFER SYSTEM, DATA TRANSFER METHOD, RECEIVING CIRCUIT, AND RECEIVING METHOD

(71) Applicant: Fujitsu Semiconductor Limited, Yokohama (JP)

(72) Inventor: Satoshi Takashima, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 23 days.

(21) Appl. No.: 13/670,749

(22) Filed: Nov. 7, 2012

(65) Prior Publication Data

US 2013/0121429 A1    May 16, 2013

(30) Foreign Application Priority Data

Nov. 14, 2011    (JP) ................................. 2011-248842

(51) Int. Cl.
*H04L 27/00*    (2006.01)

(52) U.S. Cl.
USPC ........... 375/259; 375/270; 375/295; 375/316; 375/342; 375/346; 327/145; 327/161

(58) Field of Classification Search
USPC ......... 375/219, 222, 254, 259, 260, 262, 268, 375/270, 286, 295, 299, 316, 320, 324, 338, 375/340, 342, 343, 346
See application file for complete search history.

(56) References Cited

U.S. PATENT DOCUMENTS

| | | | | |
|---|---|---|---|---|
| 5,509,038 A * | 4/1996 | Wicki | | 375/371 |
| 5,933,459 A * | 8/1999 | Saunders et al. | | 375/317 |
| 7,071,746 B2 * | 7/2006 | Suda et al. | | 327/158 |
| 7,284,145 B2 * | 10/2007 | Kawabata | | 713/600 |
| 7,741,892 B2 * | 6/2010 | Kang | | 327/161 |
| 8,149,980 B2 * | 4/2012 | Chatwin | | 375/375 |
| 2002/0067787 A1 * | 6/2002 | Naven et al. | | 375/359 |
| 2003/0172210 A1 * | 9/2003 | Ogawa et al. | | 710/62 |
| 2009/0073827 A1 * | 3/2009 | Hsieh et al. | | 369/47.5 |
| 2011/0001039 A1 * | 1/2011 | Hoshino | | 250/208.1 |
| 2012/0224712 A1 * | 9/2012 | Shiba | | 381/77 |
| 2013/0043915 A1 * | 2/2013 | Gupta | | 327/145 |

FOREIGN PATENT DOCUMENTS

| | | |
|---|---|---|
| JP | 01-23637 | 1/1989 |
| JP | 09-6725 | 1/1997 |
| JP | 2001-306491 | 11/2001 |
| JP | 2002-269036 | 9/2002 |

* cited by examiner

*Primary Examiner* — Hirdepal Singh
(74) *Attorney, Agent, or Firm* — Fujitsu Patent Center

(57) ABSTRACT

A data transfer system includes a transmission circuit, which operates by a first clock signal, and a receiving circuit, which operates by a second clock signal different from the first clock signal. The transmission circuit includes an output circuit that outputs a poll signal, of which a level is logically inverted in accordance with a transmission timing of transmission data from the transmission circuit to the receiving circuit. A first signal generating circuit receives the transmission data at a plurality of timings and generates plural sets of reception data corresponding to the plurality of timings. A second signal generating circuit receives the poll signal at the plurality of timings and generates synchronous poll signals corresponding to the plurality of timings. A data selecting circuit compares levels of the synchronous poll signals with each other and selects one of the sets of reception data based on the comparison result.

11 Claims, 10 Drawing Sheets

Fig.5

| A | B | OUT | RDO |
|---|---|---|---|
| L | L | IN1 | RD3 |
| L | H | IN2 | RD2 |
| H | L | IN3 | RD1 |
| H | H | IN4 | RD3 |

Fig.6

| PL1 | PL2 | PL3 | RDO |
|---|---|---|---|
| L | L | L | Select RD2 |
| L | L | H | Select RD1 |
| L | H | L | Not Occurred |
| L | H | H | Select RD3 |
| H | L | L | Select RD3 |
| H | L | H | Not Occurred |
| H | H | L | Select RD1 |
| H | H | H | Select RD2 |

DATA TRANSFER SYSTEM, DATA TRANSFER METHOD, RECEIVING CIRCUIT, AND RECEIVING METHOD

CROSS-REFERENCE TO RELATED APPLICATIONS

This application is based upon and claims the benefit of priority from prior Japanese Patent Application No. 2011-248842, filed on Nov. 14, 2011, the entire contents of which are incorporated herein by reference.

FIELD

This disclosure relates to a data transfer system, a data transfer method, a receiving circuit, and a receiving method.

BACKGROUND

Japanese Laid-open Patent Publications No. 2001-306491 and No. 2002-269036 describe a data transfer method with handshake using a control signal between two circuits that operate based on clock signals of different frequencies. In this method, the data transfer is controlled to start based on a data request, and the next transmission is prepared in response to a reception completion notification.

Japanese Laid-open Patent Publication No. 9-6725 describes a data transfer method using a strobe signal between two circuits. In this method, a transmission circuit transmits the strobe signal together with data. A receiving circuit receives the data in synchronization with the strobe signal and reads the received data with a clock signal.

Japanese Laid-open Patent Publication No. 1-23637 describes a data transfer method using control data with a flag between two circuits. In this method, a receiving circuit receives the flag and the control data at a plurality of times and processes the same control data during continuous receiving of the same flag, thereby reducing transmission errors.

SUMMARY

Transfer of continuous data between two circuits that asynchronously operate based on different clock signals is desired.

According to one aspect, a data transfer system includes a transmission circuit configured to operate by a first clock signal and a receiving circuit configured to operate by a second clock signal different from the first clock signal. The transmission circuit includes an output circuit configured to output a poll signal. The output circuit logically inverts a level of the poll signal in accordance with a transmission timing of transmission data from the transmission circuit to the receiving circuit. The receiving circuit includes a first signal generating circuit, a second signal generating circuit, and a data selecting circuit. The first signal generating circuit receives the transmission data at a plurality of timings and generates a plurality of sets of reception data respectively corresponding to the plurality of timings. The second signal generating circuit receives the poll signal at the plurality of timings and generates a plurality of synchronous poll signals respectively corresponding to the plurality of timings. The data selecting circuit compares levels of the plurality of synchronous poll signals with each other and selects one of the plurality of sets of reception data in accordance with a result of the comparison.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

The embodiment, together with objects and advantages thereof, may best be understood by reference to the following description of the presently preferred embodiments together with the accompanying drawings in which:

FIGS. 5 and 6 are explanatory diagrams illustrating an operation of the decoder;

DESCRIPTION OF THE EMBODIMENTS

One embodiment will now be described below with reference to accompanying drawings.

Figure 1:
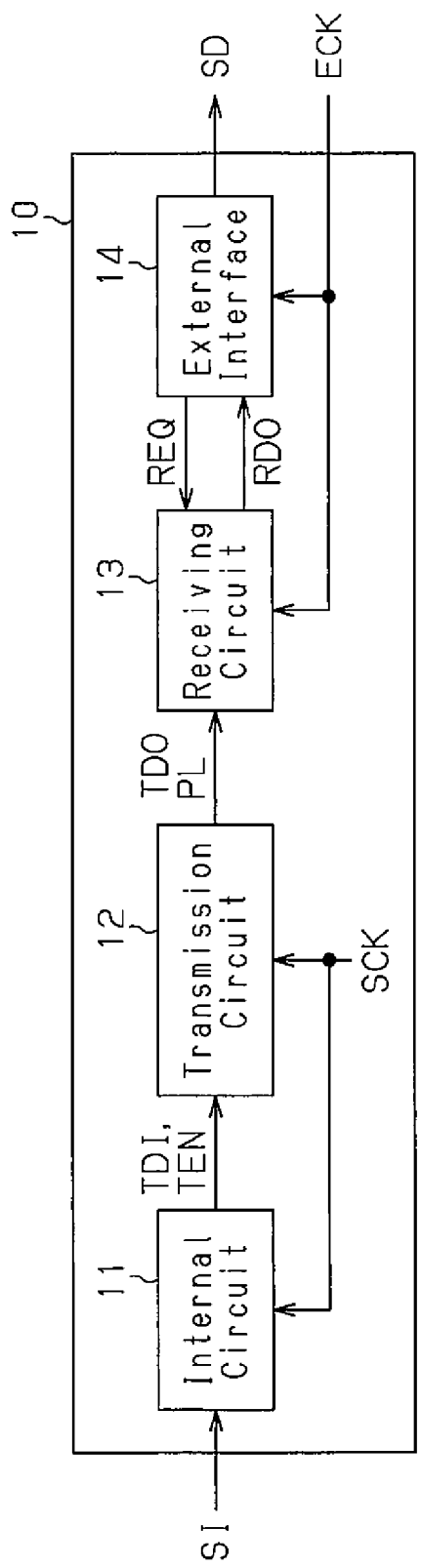
FIG. 1 is a schematic block circuit diagram illustrating a semiconductor device.

As illustrated in FIG. 1, a semiconductor device 10 outputs data SD according to an input signal SI based on an external clock signal ECK. The input signal SI is an analog signal such as a voltage that is output from a sensor. The data SD is, for example, serial data of a plurality of bits. For example, the semiconductor device 10 converts the analog input signal SI into a digital signal of a plurality of bits and serially outputs the digital signal as the data SD based on the external clock signal ECK. The semiconductor device 10 is an example of a data transfer system.

An internal circuit 11 of the semiconductor device 10 outputs data and a control signal in accordance with the input signal SI. The internal circuit 11, which is for example an analog-digital converting circuit, operates based on an internal clock signal SCK that is different from the external clock signal ECK, and converts the analog input signal SI into a digital signal. The internal circuit 11 outputs the digital signal as data TDI. The data TDI is, for example, 8-bit data. The internal clock signal SCK is an example of a first clock signal. The external clock signal ECK is an example of a second clock signal.

The internal circuit 11 outputs a transmission enable signal TEN in correspondence with the data TDI. The transmission enable signal TEN indicates that the internal circuit 11 outputs the data TDI that is valid. The internal circuit 11 outputs the transmission enable signal TEN having a given level (for example, an H level) during a given period (for example, a period equivalent to one cycle time of the internal clock signal SCK). The internal circuit 11 outputs the data TDI during a period when the circuit outputs the transmission enable signal TEN of the given level.

A transmission circuit 12 receives the internal clock signal SCK. The transmission circuit 12 latches the valid data TDI in synchronization with the internal clock signal SCK in response to the transmission enable signal TEN that is output from the internal circuit 11. The transmission circuit 12 outputs data TDO that is equivalent to the latched data TDI. The transmission circuit 12 outputs a poll signal PL. A level of the poll signal PL is inverted at each time when the data TDO is output.

The receiving circuit 13 receives the data TDO, which is output from the transmission circuit 12, at different timings in response to a read request signal REQ that is supplied from an external interface 14. Further, the receiving circuit 13 receives the poll signal PL, which is output from the transmission circuit 12, at the different timings according to the read request signal REQ. Then, based on a plurality of poll signals PL (in this example, PL1, PL2, and PL3) that are received at the different timings, the receiving circuit 13 outputs reception data RDO that is equivalent to one of a plurality of sets of data TDO that are received. The read request signal REQ is an example of a timing signal.

The external interface 14 serially communicates with a semiconductor device (not illustrated) based on a given system. A communication system is a serial communication (for example, SPI (Serial Peripheral Interface) system) that is synchronous with the external clock signal ECK. The external interface 14 parallel-serial converts the reception data RDO that is output from the receiving circuit 13, and outputs the converted data.

The internal circuit 11 outputs the transmission enable signal TEN and the data TDI at each given interval. For example, the external interface 14 outputs the data SD in a given cycle to other semiconductor device coupled to the semiconductor device 10. In this case, the cycle of outputting the data TDI is set in accordance with a cycle in which the external interface 14 outputs the data SD.

However, the internal circuit 11 and the external interface 14 do not operate in conjunction with each other. As described above, the internal circuit 11 operates based on the internal clock signal SCK to output the data TDI and the transmission enable signal TEN. On the other hand, the external interface 14 operates in synchronization with the external clock signal ECK for serial communication to output the read request signal REQ. That is, the timing when the internal circuit 11 outputs the data TDI and the timing when the external interface 14 outputs the read request signal REQ are asynchronous.

As described above, the transmission circuit 12 inverts a level of the poll signal PL at each time when the circuit outputs the data TDO. The receiving circuit 13, in response to the read request signal REQ, receives the poll signal at plural timings and also receives the transmission data TDO at plural timings. Then, the receiving circuit 13, based on the poll signals that are received at different timings, outputs the reception data RDO that is equivalent to one of a plurality of sets of received data. In this manner, the transmission circuit 12 and the receiving circuit 13 asynchronously transmit and receive data without mutually performing handshake.

A configuration of the transmission circuit 12 will now be described.

Figure 2:
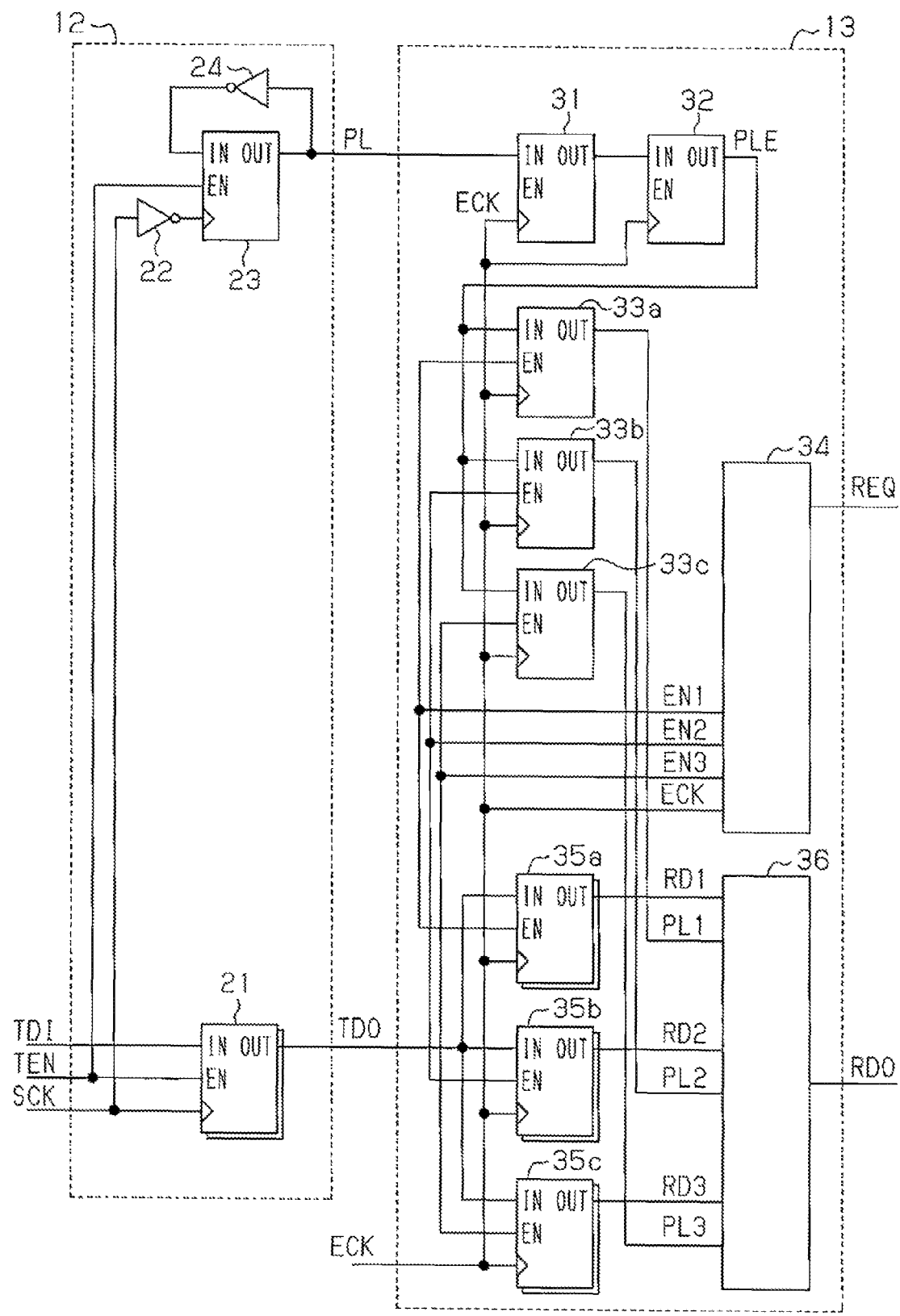
FIG. 2 is a schematic circuit diagram illustrating a transmission circuit and a receiving circuit.

As illustrated in FIG. 2, the data TDI is supplied to an input terminal IN of a flip-flop circuit 21 of the transmission circuit 12. As described above, the data TDI is a signal of the plurality of bits (for example, 8 bits). The flip-flop circuit 21 includes a plurality of flip-flops in correspondence with the number of bits of the data TDI. Each of the flip-flops receives a corresponding bit of the data TDI.

The flip-flop circuit 21 is a D-type flip-flop circuit, for example. The transmission enable signal TEN is supplied to an enable terminal EN of the flip-flop circuit 21, and the internal clock signal SCK is supplied to a clock terminal of the flip-flop circuit 21. The level of the transmission enable signal TEN indicates whether the data TDI is valid or invalid. For example, the transmission enable signal TEN of an H level indicates that the data TDI is valid, and the transmission enable signal TEN of an L level indicates that the data TDI is invalid.

The internal circuit 11 illustrated in FIG. 1 outputs the transmission enable signal TEN in accordance with a timing of outputting the data TDI. For example, the internal circuit 11 alternately outputs the transmission enable signal TEN of the H level and the transmission enable signal TEN of the L level in each one cycle of the internal clock signal SCK. The internal circuit 11 outputs the data TDI after a half cycle of the internal clock signal SCK in a period of outputting the transmission enable signal TEN of the H level.

The flip-flop circuit 21 operates based on the transmission enable signal TEN, latches the valid data TDI in synchronization with the internal clock signal SCK, and outputs the data TDO from an output terminal OUT. For example, when the transmission enable signal TEN is at the H level, the flip-flop circuit 21 latches the data TDI at a timing of a rising edge of the internal clock signal SCK. Then, the flip-flop circuit 21 outputs the data TDO having a level of the latched data TDI. The number of bits of the output data TDO is equivalent to the number of bits of the input data TDI.

The internal clock signal SCK is supplied to an input terminal of an inverter circuit 22. The inverter circuit 22 logically inverts a level of the internal clock signal SCK. An output signal of the inverter circuit 22 is supplied to a clock terminal of a flip-flop circuit 23. The flip-flop circuit 23 is a D-type flip-flop circuit, for example. The transmission enable signal TEN is supplied to an enable terminal EN of the flip-flop circuit 23. An output terminal OUT of the flip-flop circuit 23 is coupled to an input terminal of an inverter circuit 24. An output terminal of the inverter circuit 24 is coupled to an input terminal IN of the flip-flop circuit 23. The flip-flop circuit 23 is an example of an output circuit.

The flip-flop circuit 23 operates based on the transmission enable signal TEN, latches an output signal of the inverter circuit 24 in synchronization with the internal clock signal SCK, and outputs the poll signal PL from the output terminal OUT. For example, when the transmission enable signal TEN is at the H level, the flip-flop circuit 23 latches the output signal of the inverter circuit 24 at a timing of a rising edge of the output signal of the inverter circuit 22, that is, at a timing of a falling edge of the internal clock signal SCK. Then, the flip-flop circuit 23 outputs the poll signal PL having a level of the latched output signal. The poll signal PL is supplied to the inverter circuit 24. The inverter circuit 24 logically inverts the level of the poll signal PL. The flip-flop circuit 23 operates in response to the transmission enable signal TEN of the H level. Thus, the flip-flop circuit 23 logically inverts the level of the poll signal PL at each time when the transmission enable signal TEN of the H level is input, that is, at each time when the data TDO is output.

A configuration of the receiving circuit 13 will now be described.

The poll signal PL is supplied to an input terminal IN of a flip-flop circuit 31 of the receiving circuit 13. An output terminal OUT of the flip-flop circuit 31 is coupled to an input terminal IN of a flip-flop circuit 32. The external clock signal ECK is supplied to clock terminals of the flip-flop circuits 31 and 32.

The flip-flop circuits 31 and 32 are D-type flip-flop circuits, for example. The flip-flop circuit 31 latches the poll signal PL in synchronization with a rising edge of the external clock signal ECK, and outputs a signal having a level of the latched poll signal PL. The flip-flop circuit 32 latches the output signal of the flip-flop circuit 31 in synchronization with a rising edge of the external clock signal ECK, and outputs a signal PLE having a level of the latched output signal. In this manner, the flip-flop circuits 31 and 32 generate a signal (hereinafter referred to as "reception poll signal") PLE that is synchronous with the external clock signal ECK.

The reception poll signal PLE is supplied to input terminals IN of three flip-flop circuits 33a, 33b, and 33c. The flip-flop circuits 33a to 33c are D-type flip-flop circuits, for example. The external clock signal ECK is supplied to clock terminals of the flip-flop circuits 33a to 33c.

A first reception enable signal EN1 is supplied from an enable signal generating circuit 34 to an enable terminal EN of the flip-flop circuit 33a. The flip-flop circuit 33a latches the reception poll signal PLE at a timing of a rising edge of the external clock signal ECK in response to the reception enable signal EN1 of the H level. Then, the flip-flop circuit 33a outputs a first synchronous poll signal PL1 having a level of the latched signal PLE.

A second reception enable signal EN2 is supplied from the enable signal generating circuit 34 to an enable terminal EN of the flip-flop circuit 33b. The flip-flop circuit 33b latches the reception poll signal PLE at a timing of a rising edge of the external clock signal ECK in response to the reception enable signal EN2 of the H level. Then, the flip-flop circuit 33b outputs a second synchronous poll signal PL2 having a level of the latched signal PLE.

A third reception enable signal EN3 is supplied from the enable signal generating circuit 34 to an enable terminal EN of the flip-flop circuit 33c. The flip-flop circuit 33c latches the reception poll signal PLE at a timing of a rising edge of the external clock signal ECK in response to the reception enable signal EN3 of the H level. Then, the flip-flop circuit 33c outputs a third synchronous poll signal PL3 having a level of the latched signal PLE.

The read request signal REQ and the external clock signal ECK are supplied from the external interface 14 illustrated in FIG. 1 to the enable signal generating circuit 34. The enable signal generating circuit 34 generates the first to third reception enable signals EN1 to EN3 at mutually different timings based on the external clock signal ECK and the read request signal REQ.

Figure 3:
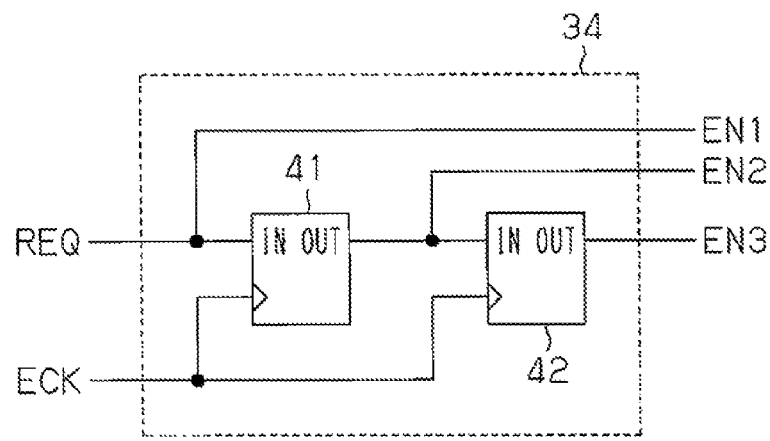
FIG. 3 is a schematic circuit diagram illustrating an enable signal generating circuit.

As illustrated in FIG. 3, the enable signal generating circuit 34 includes two flip-flop circuits 41 and 42. The flip-flop circuits 41 and 42 are D-type flip-flop circuits, for example. The read request signal REQ is supplied to a data input terminal IN of the flip-flop circuit 41. The enable signal generating circuit 34 outputs the read request signal REQ as the first reception enable signal EN1.

The external clock signal ECK is supplied to a clock terminal of the flip-flop circuit 41. The flip-flop circuit 41 latches the read request signal REQ at a timing of a rising edge of the external clock signal ECK, and outputs the second reception enable signal EN2 having a level of the latched signal REQ. The read request signal REQ has a pulse width of one cycle time of the external clock signal ECK and is generated in synchronization with a rising edge of the external clock signal ECK. A waveform and a timing of the first reception enable signal EN1 are substantially equivalent to a waveform and a timing of the read request signal REQ. Therefore, the second reception enable signal EN2 is delayed by one cycle time of the external clock signal ECK from the first reception enable signal EN1.

An output terminal OUT of the flip-flop circuit 41 is coupled to an input terminal IN of the flip-flop circuit 42. The external clock signal ECK is supplied to a clock terminal of the flip-flop circuit 42. The flip-flop circuit 42 latches the second reception enable signal EN2 at a timing of a rising edge of the external clock signal ECK, and outputs a third reception enable signal EN3 having a level of the latched signal EN2. Thus, the third reception enable signal EN3 is delayed by one cycle time of the external clock signal ECK from the second reception enable signal EN2.

In this manner, the enable signal generating circuit 34 outputs the first reception enable signal EN1 at the timing substantially equivalent to the rising and falling timing of the read request signal REQ. Further, the enable signal generating circuit 34 generates the second reception enable signal EN2 that is delayed by one cycle time of the external clock signal ECK from the read request signal REQ. Further, the enable signal generating circuit 34 generates the third reception enable signal EN3 that is delayed by two cycle times of the external clock signal ECK from the read request signal REQ.

The external interface 14 illustrated in FIG. 1 outputs the read request signal REQ in synchronization with the external clock signal ECK. The read request signal REQ is a pulse signal that has a pulse width according to the cycle of the external clock signal ECK, for example, a pulse width of one cycle time of the external clock signal ECK.

Accordingly, the flip-flop circuits 33a to 33c illustrated in FIG. 2 operate in mutually different periods based on the first to third reception enable signals EN1 to EN3, respectively, and latch one reception poll signal PLE at different timings. Then, the flip-flop circuits 33a to 33c respectively output the first to third synchronous poll signals PL1 to PL3 that have levels of signals that are latched by the respective flip-flop circuits 33a to 33c. The flip-flop circuits 33a to 33c are an example of a second signal generating circuit.

The first to third reception enable signals EN1 to EN3 that are output from the enable signal generating circuit 34 are also supplied to enable terminals EN of three flip-flop circuits 35a, 35b, and 35c, respectively. The external clock signal ECK is supplied to clock terminals of the flip-flop circuits 35a to 35c.

The transmission data TDO is supplied to input terminals IN of the flip-flop circuits 35a to 35c. As described above, the transmission data TDO is data of the plurality of bits (for example, 8 bits). In a similar manner to that of the flip-flop circuit 21 of the transmission circuit 12, each of the flip-flop circuits 35a to 35c includes a plurality of flip-flops in correspondence with the number of bits of the transmission data TDO, and each of the flip-flops receives a corresponding bit of the transmission data TDO.

The flip-flop circuits 35a to 35c are D-type flip-flop circuits, for example. The flip-flop circuits 35a to 35c operate based on the reception enable signals EN1 to EN3 of the H levels, and latch the transmission data TDO in synchronization with the external clock signal ECK. The flip-flop circuits 35a to 35c are an example of a first signal generating circuit.

As described above, the first to third reception enable signals EN1 to EN3 are pulse signals that are generated by sequentially shifting the external clock signal ECK by one cycle time. Therefore, the flip-flop circuits 35a to 35c latch the transmission data TDO at different timings by operating in different periods based on the first to third reception enable signals EN1 to EN3. Then, the flip-flop circuits 35a to 35c respectively output first reception data RD1, second reception data RD2, and third reception data RD3 that have levels of signals latched by the respective flip-flop circuits 35a to 35c.

The reception data RD1 to RD3 are supplied to a decoder 36. The synchronous poll signals PL1 to PL3 from the flip-flop circuits 33a to 33c are supplied to the decoder 36. The decoder 36 compares levels of the synchronous poll signals PL1 to PL3 with each other and selects one of the reception data RD1 to RD3 in accordance with a result of the comparison. Then, the decoder 36 outputs the output data RDO that is equivalent to the selected reception data. The decoder 36 is an example of a data selecting circuit.

Figure 4:
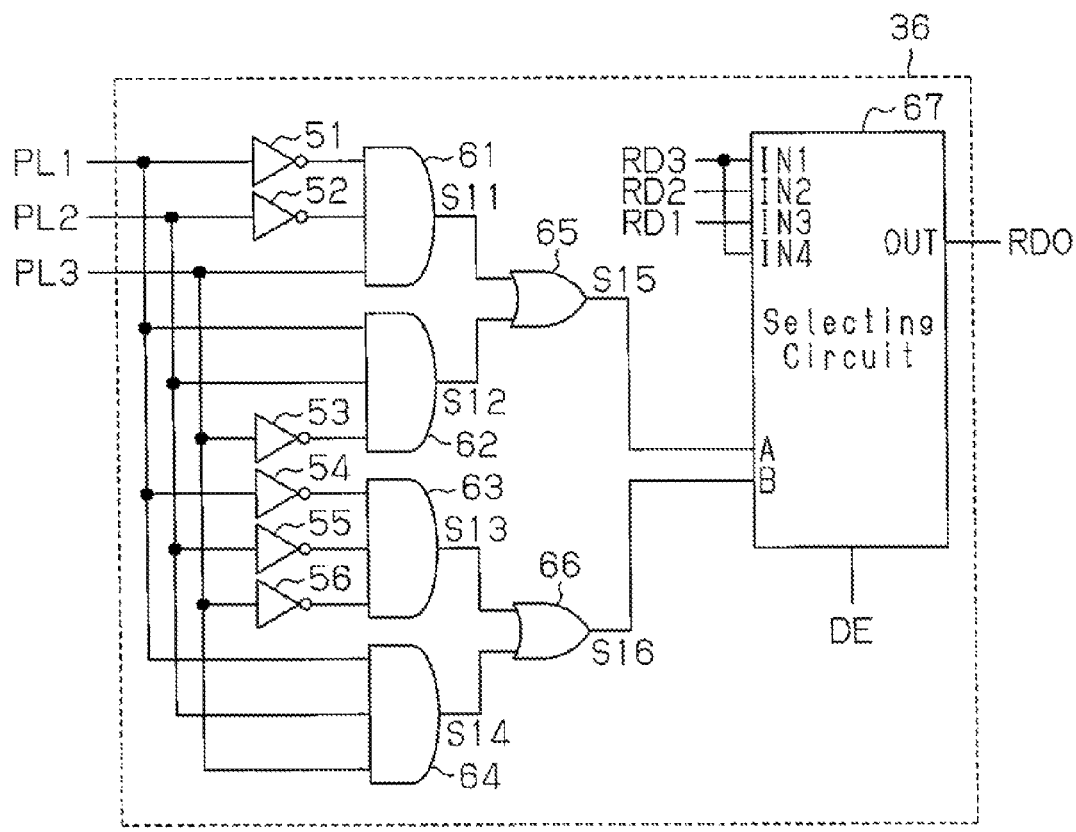
FIG. 4 is a schematic circuit diagram illustrating a decoder.

As illustrated in FIG. 4, an inverter circuit 51 of the decoder 36 outputs a logical inversion signal of the first synchronous poll signal PL1. An inverter circuit 52 outputs a logical inversion signal of the second synchronous poll signal PL2. An AND circuit 61 performs a logical AND operation on the output signals of the inverter circuits 51 and 52 and the third synchronous poll signal PL3, and generates a signal S11 that indicates a result of the calculation. Thus, the AND circuit 61 generates the signal S11 of the H level when levels of the synchronous poll signals PL1, PL2, and PL3 are "L, L, H", and generates the signal S11 of the L level when the levels of the synchronous poll signals PL1, PL2, and PL3 are other than the above combination.

An inverter circuit 53 outputs a logical inversion signal of the third synchronous poll signal PL3. An AND circuit 62 performs a logical AND operation on the first and second synchronous poll signals PL1 and PL2 and the output signal of the inverter circuit 53, and generates a signal S12 that indicates a result of the calculation. Thus, the AND circuit 62 generates the signal S12 of the H level when levels of the synchronous poll signals PL1, PL2, and PL3 are "H, H, L", and generates the signal S12 of the L level when the levels of the synchronous poll signals PL1, PL2, and PL3 are other than the above combination.

Inverter circuits 54 to 56 output logical inversion signals of the first to third synchronous poll signals PL1 to PL3, respectively. An AND circuit 63 performs a logical AND operation on output signals of the inverter circuits 54 to 56, and generates a signal S13 that indicates a result of the calculation. Thus, the AND circuit 63 generates the signal S13 of the H level when levels of the synchronous poll signals PL1, PL2, and PL3 are "L, L, L", and generates the signal S13 of the L level when the levels of the synchronous poll signals PL1, PL2, and PL3 are other than the above combination.

An AND circuit 64 performs a logical AND operation on the first and second synchronous poll signals PL1 to PL3, and generates a signal S14 that indicates a result of the calculation. Thus, the AND circuit 64 generates the signal S14 of the H level when levels of the synchronous poll signals PL1, PL2, and PL3 are "H, H, H", and generates the signal S14 of the L level when the levels of the synchronous poll signals PL1, PL2, and PL3 are other than the above combination.

An OR circuit 65 performs a logical OR operation on the output signal S11 of the first AND circuit 61 and the output signal S12 of the second AND circuit 62, and generates a signal S15 that indicates a result of the calculation. The signal S15 is supplied to a control input terminal A of a selecting circuit 67. An OR circuit 66 performs a logical OR operation on the output signal S13 of the third AND circuit 63 and the output signal S14 of the fourth AND circuit 64, and generates a signal S16 that indicates a result of the calculation. The signal S16 is supplied to a control input terminal B of the selecting circuit 67.

The selecting circuit 67 includes first to fourth selection input terminals IN1 to IN4. The third reception data RD3 is supplied to the first selection input terminal IN1 and the fourth selection input terminal IN4. The second reception data RD2 is supplied to the second selection input terminal IN2. The first reception data RD1 is supplied to the third selection input terminal IN3. As illustrated in FIG. 5, the selecting circuit 67 selects one of the signals supplied to the selection input terminals IN1 to IN4 in accordance with the signals S15 and S16 supplied to the control input terminals A and B, and outputs output data RDO having a level of the selected signal (that is, the reception data).

The selecting circuit 67 operates in response to a control signal DE. For example, the control signal DE may be generated to enable the selecting circuit 67 to select a signal (reception data) within a period from when the receiving circuit 13 receives at three times the poll signal PL (the synchronous poll signals PL1 to PL3) and the transmission data TDO until when the receiving circuit 13 receives the next read request signal REQ. In this case, it is desirable that a period required from reception of the read request signal REQ to determination of the reception data is short. Therefore, it is preferable that the control signal DE is supplied immediately after a third reception of the poll signal PL and the transmission data TDO. For example, the third reception enable signal EN3 may be used for the control signal DE. In this case, the selecting circuit 67 selects and outputs the reception data based on the timing of a falling edge of the third reception enable signal EN3.

As described above, the synchronous poll signals PL1 to PL3 are generated in this order by latching the reception poll signal PLE. Therefore, among the synchronous poll signals PL1 to PL3, at least two poll signals of which generation orders are continuous have equal levels. For example, at a certain timing, a level of the first synchronous poll signal PL1 and a level of the second synchronous poll signal PL2 are equal, and a level of the third synchronous poll signal PL3 is different from the levels of the first and second synchronous poll signals PL1 and PL2. At another timing, a level of the first synchronous poll signal PL1 is different from levels of the second and third synchronous poll signals PL2 and PL3. At still another timing, levels of the first to third synchronous poll signals PL1 to PL3 are equal.

The flip-flop circuits 33a to 33c illustrated in FIG. 2 generate the first to third synchronous poll signals PL1 to PL3 by latching the reception poll signal PLE based on the first to third reception enable signals EN1 to EN3 generated by the enable signal generating circuit 34 that responds to the read request signal REQ. Therefore, when levels of the first to third synchronous poll signals PL1 to PL3 are equal to each other, this indicates that the level of the reception poll signal PLE does not change (that is, an edge of the signal PLE is not present) during a period of latching the first to third synchronous poll signals PL1 to PL3. On the other hand, when a level of one of the first to third synchronous poll signals PL1 to PL3 is different from levels of other synchronous poll signals, this indicates that a level of the reception poll signal PLE changes (that is, an edge of the signal PLE is present) during a period of latching the first to third synchronous poll signals PL1 to PL3.

As illustrated in FIG. 2, the receiving circuit 13 latches the poll signal PL, which is output from the transmission circuit 12, as the reception poll signal PLE in synchronization with the external clock signal ECK. The transmission circuit 12, based on the transmission enable signal TEN, inverts the level of the poll signal PL in synchronization with a falling edge of the internal clock signal SCK and outputs the transmission data TDO in synchronization with a rising edge of the next internal clock signal SCK. In other words, the transmission circuit 12 outputs the transmission data TDO after a half cycle of the internal clock signal SCK since the level of the poll signal PL is inverted.

In the transmission circuit 12, the flip-flop circuit 21 holds the transmission data TDO until when latching the next input data TDI by the internal clock signal SCK. In the receiving circuit 13, the two flip-flop circuits 31 and 32, which are coupled in series, generate the reception poll signal PLE according to the poll signal PL in synchronization with the external clock signal ECK. In the present embodiment, a frequency of the external clock signal ECK is an integer times (for example, four times) of a frequency of the internal clock signal SCK. Therefore, a timing when a level of the reception poll signal PLE changes is substantially equivalent to a timing when the transmission circuit 12 changes a value of the transmission data TDO.

A level of an input signal latched by a flip-flop circuit following a clock signal changes in accordance with both a latch timing of the input signal by the flip-flop circuit and a transition timing of the input signal. Therefore, for example, when the input signal is shifted from the L level to the H level, there arise a case where the input signal of the L level is latched and a case where the input signal of the H level is latched. In other words, when the transition timing of the input signal and the operation timing of the flip-flop circuit are equal or close to each other, it sometimes occurs that the latched signal level is not determined, that is, indeterminate.

When levels of the synchronous poll signals PL1 to PL3 are equal to each other, a level of the synchronous poll signal PL1 does not change. Further, the transmission data TDO also does not change. However, the level of the reception poll signal PLE may change immediately before or immediately after a period during which the levels of the synchronous poll signals PL1 to PL3 are equal to each other. Therefore, among three continuous timings corresponding to the synchronous poll signals PL1 to PL3, a level of the reception data RD2 obtained by latching the transmission data TDO at the center timing is most stable. Accordingly, as illustrated in FIG. 6, when the levels of the synchronous poll signals PL1 to PL3 are equal to each other, the decoder 36 selects the reception data RD2 at the center, and outputs the reception data RDO that is equivalent to the reception data RD2.

Further, when levels of two of the synchronous poll signals PL1 to PL3 are different from a level of the other signal, among the two synchronous poll signals of which the levels are equal to each other, the decoder 36 selects the reception data corresponding to the synchronous poll signal that is farthest in time from a transition timing of the reception poll signal PLE. For example, as illustrated in FIG. 6, when the levels of the synchronous poll signals PL1, PL2, and PL3 are "L, L, H", an edge (a rising edge) of the reception poll signal PLE is positioned between a timing when the second synchronous poll signal PL2 is latched and a timing when the third synchronous poll signal PL3 is latched. In this case, the first synchronous poll signal PL1 is farthest in time from the edge of the reception poll signal PLE. Therefore, the decoder 36 selects the reception data RD1 corresponding to the first synchronous poll signal PL1, and outputs the reception data RDO that is equivalent to the reception data RD1.

When the levels of the synchronous poll signals PL1, PL2, and PL3 are "H, L, L", an edge (a falling edge) of the reception poll signal PLE is positioned between a timing when the first synchronous poll signal PL1 is latched and a timing when the second synchronous poll signal PL2 is latched. In this case, the third synchronous poll signal PL3 is farthest in time from the edge of the reception poll signal PLE. Therefore, the decoder 36 selects the reception data RD3 corresponding to the third synchronous poll signal PL3, and outputs the reception data RDO that is equivalent to the reception data RD3.

Among combinations of the levels of the synchronous poll signals PL1, PL2, and PL3, there does not arise a combination that the level of the second synchronous poll signal PL2 is different from the levels of the first and third synchronous poll signals PL1 and PL3. This is because a level of the reception poll signal PLE, that is, a level of the poll signal PL output from the transmission circuit 12 illustrated in FIG. 2, changes for each reception of the transmission data TDO.

Operations of the transmission circuit 12 and the receiving circuit 13 will now be described with reference to FIGS. 7 to 11.

Since the operation of the transmission circuit 12 and the operation of the receiving circuit 13 are asynchronous, timings of signals are different in time. In FIGS. 7 to 11, to facilitate understanding of generation timings of signals, the generation timings of signals are explained by using the same symbol. Therefore, symbols that illustrate timings do not necessarily increase along lapse of time.

First, a case where the transmission data TDO and the read request signal REQ do not collide, that is, a case where a timing when the transmission data TDO is changed is not superimposed on a transition timing of various signals that are generated based on the read request signal REQ will now be described.

Figure 7:
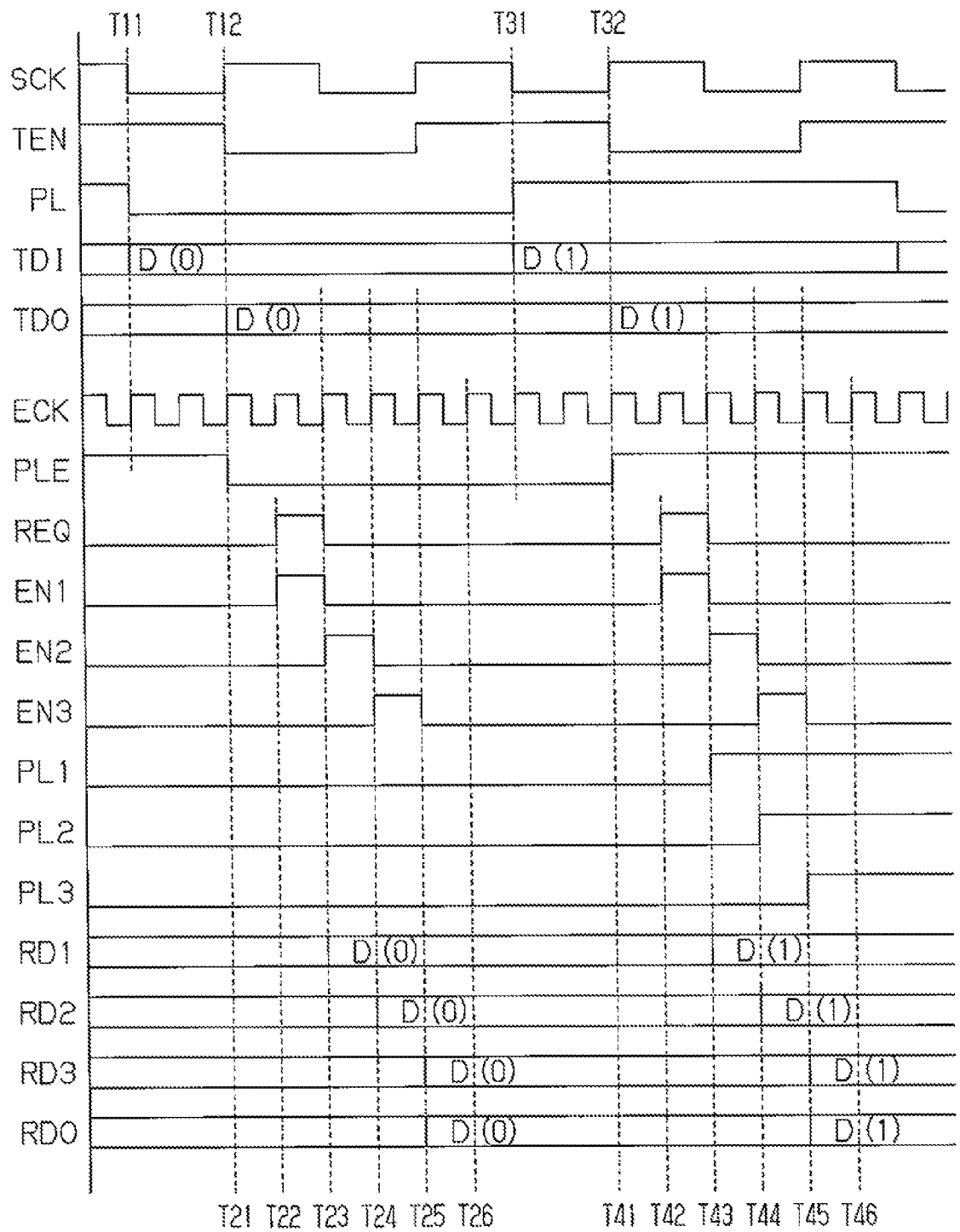
FIGS. 7, 8, 9, 10, and 11 are timing diagrams of data transfer.

As illustrated in FIG. 7, the flip-flop circuit 23 of the transmission circuit 12 operates based on the transmission enable signal TEN of the H level, and outputs the poll signal PL of the L level in synchronization with a rising edge of a signal supplied to the clock terminal (a falling edge of the internal clock signal SCK) (at time T11). Next, the flip-flop circuit 21 of the transmission circuit 12 latches the data TDI in synchronization with a rising edge of the internal clock signal SCK, and outputs the transmission data TDO equivalent to the latched data (at time T12).

The internal circuit 11 illustrated in FIG. 1 sequentially outputs the data TDI. To distinguish between changes in time of the sequentially output data TDI, explanation is performed by using "D (0), D (1), . . . " when necessary.

As illustrated in FIG. 7, the data TDI is output as data D (0) at time T11. Then, the transmission circuit 12 outputs the data D (0) at time T12.

The flip-flop circuit 32 of the receiving circuit 13 outputs the reception poll signal PLE of the L level based on the poll signal PL of the L level (at time T21). Next, the enable signal generating circuit 34 of the receiving circuit 13 receives the read request signal REQ (at time T22), and generates the first reception enable signal EN1 (at time T22). Next, the enable signal generating circuit 34 generates the second reception enable signal EN2 in synchronization with the external clock signal ECK (at time T23), and next generates the third reception enable signal EN3 in synchronization with the external clock signal ECK (at time T24).

The flip-flop circuit 33a outputs the synchronous poll signal PL1 of the L level in synchronization with the external clock signal ECK in response to the first reception enable signal EN1 (at time T23). Similarly, the flip-flop circuit 33b outputs the synchronous poll signal PL2 of the L level in synchronization with the external clock signal ECK in response to the second reception enable signal EN2 (at time T24). Similarly, the flip-flop circuit 33c outputs the synchronous poll signal PL3 of the L level in synchronization with the external clock signal ECK in response to the third reception enable signal EN3 (at time T25).

The flip-flop circuit 35a outputs the reception data RD1 (D (0)) in synchronization with the external clock signal ECK in response to the first reception enable signal EN1 (at time T23). Similarly, the flip-flop circuit 35b outputs the reception data RD2 (D (0)) in synchronization with the external clock signal ECK in response to the second reception enable signal EN2 (at time T24). Similarly, the flip-flop circuit 35c outputs the reception data RD3 (D (0)) in synchronization with the external clock signal ECK in response to the third reception enable signal EN3 (at time T25).

The decoder 36 selects the second reception data RD2 based on the synchronous poll signals PL1 to PL3 of the L levels, and outputs the output data RDO (D (0)) equivalent to the reception data RD2. In this manner, after the external interface 14 illustrated in FIG. 1 transmits the read request signal REQ, the level of the output data RDO of the receiving circuit 13 is determined at a timing after three cycle times of the external clock signal ECK (at time T26). Thus, the external interface 14 receives the determined output data RDO at time T26.

Next, when the transmission enable signal TEN is at the H level, the transmission circuit 12 outputs the poll signal PL of the H level in synchronization with a falling edge of the internal clock signal SCK (at time T31). Next, the transmission circuit 12 outputs the transmission data D (1) in synchronization with a rising edge of the internal clock signal SCK (at time T32).

The flip-flop circuit 32 of the receiving circuit 13 outputs the reception poll signal PLE of the H level based on the poll signal PL of the H level (at time T41). Next, the enable signal generating circuit 34 of the receiving circuit 13 receives the read request signal REQ (at time T42), and generates the first reception enable signal EN1 (at time T42). Next, the enable signal generating circuit 34 generates the second reception enable signal EN2 in synchronization with the external clock signal ECK (at time T43), and next generates the third reception enable signal EN3 in synchronization with the external clock signal ECK (at time T44).

The flip-flop circuit 33a outputs the synchronous poll signal PL1 of the H level in synchronization with the external clock signal ECK in response to the first reception enable signal EN1 (at time T43). Similarly, the flip-flop circuit 33b outputs the synchronous poll signal PL2 of the H level in synchronization with the external clock signal ECK in response to the second reception enable signal EN2 (at time T44). Similarly, the flip-flop circuit 33c outputs the synchronous poll signal PL3 of the H level in synchronization with the external clock signal ECK in response to the third reception enable signal EN3 (at time T45).

The flip-flop circuit 35a outputs the reception data RD1 (D (1)) in synchronization with the external clock signal ECK in response to the first reception enable signal EN1 (at time T43). Similarly, the flip-flop circuit 35b outputs the reception data RD2 (D (1)) in synchronization with the external clock signal ECK in response to the second reception enable signal EN2 (at time T44). Similarly, the flip-flop circuit 35c outputs the reception data RD3 (D (1)) in synchronization with the external clock signal ECK in response to the third reception enable signal EN3 (at time T45).

The decoder 36 selects the second reception data RD2 based on the synchronous poll signals PL1 to PL3 of the H levels, and outputs the output data RDO (D (1)) equivalent to the reception data RD2. In this manner, after the external interface 14 illustrated in FIG. 1 transmits the read request signal REQ, the level of the output data RDO of the receiving circuit 13 is determined at a timing after three cycle times of the external clock signal ECK (at time T46). Thus, the external interface 14 receives the determined output data RDO at time T46.

In this manner, in response to the read request signal REQ, the receiving circuit 13 outputs the reception data D (0) at time T25, and outputs the reception data D (1) at time T45. That is, the receiving circuit 13 continuously outputs the reception data D (0) and D (1) in a cycle corresponding to the generation timing of the read request signal REQ.

Next, four cases where the transmission data TDO and the read request signal REQ collide, that is, cases where a timing when the transmission data TDO is changed is superimposed on a transition timing of various signals that are generated based on the read request signal REQ.

[Case 1]

Figure 8:
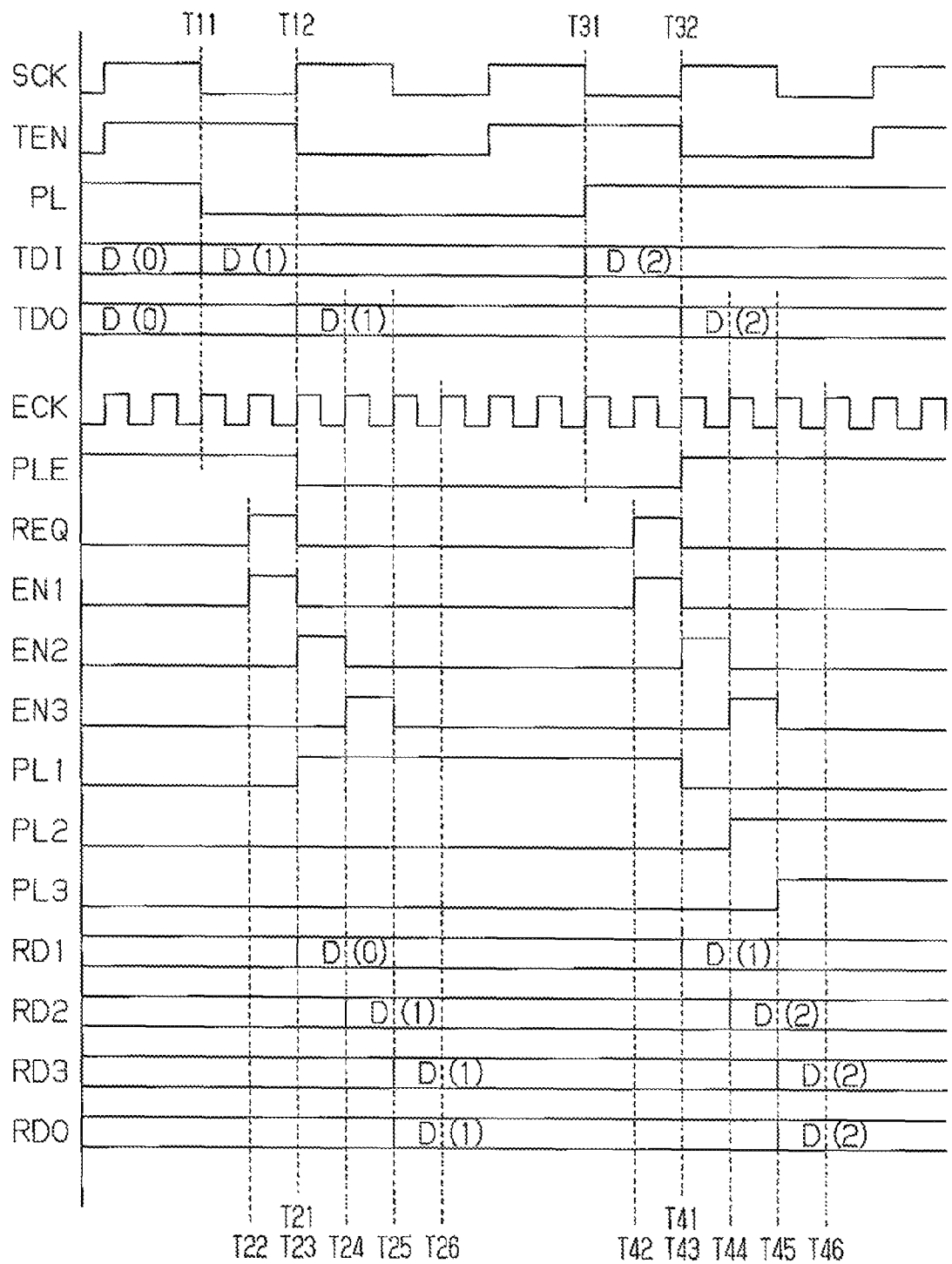

As illustrated in FIG. 8, the transmission circuit 12 outputs the transmission data D (0). When the transmission enable signal TEN is at the H level, the transmission circuit 12 outputs the poll signal PL of the L level in synchronization with a falling edge of the internal clock signal SCK (at time T11). Next, the transmission circuit 12 outputs the transmission data D (1) in synchronization with a rising edge of the internal clock signal SCK (time T12).

The enable signal generating circuit 34 of the receiving circuit 13 receives the read request signal REQ (at time T22) and generates the first reception enable signal EN1 (at time T22). Next, the enable signal generating circuit 34 generates the second reception enable signal EN2 in synchronization with the external clock signal ECK (at time T23), and next generates the third reception enable signal EN3 in synchronization with the external clock signal ECK (at time T24).

At time T21 after reception of the read request signal REQ (at time T22), the flip-flop circuit 32 of the receiving circuit 13 outputs the reception poll signal PLE of the L level based on the poll signal PL of the L level. In FIG. 8, time T21 is equivalent to time T23 of generating the second reception enable signal EN2.

The flip-flop circuit 33a outputs the synchronous poll signal PL1 of the H level in response to the first reception enable signal EN1 (at time T23). Next, the flip-flop circuit 33b outputs the synchronous poll signal PL2 of the L level in response to the second reception enable signal EN2 (at time T24), and the flip-flop circuit 33c outputs the synchronous poll signal PL3 of the L level in response to the third reception enable signal EN3 (at time T25).

The flip-flop circuit 35a, in response to the first reception enable signal EN1, latches the transmission data D (0) in synchronization with the external clock signal ECK and outputs the reception data RD1 (D (0)) (at time T23). Next, the flip-flop circuit 35b outputs the reception data RD2 (D (1)) in synchronization with the external clock signal ECK in response to the second reception enable signal EN2 (at time T24). Similarly, the flip-flop circuit 35c outputs the reception data RD3 (D (1)) in synchronization with the external clock signal ECK in response to the third reception enable signal EN3 (at time T25).

The decoder 36 selects the third reception data RD3 based on the first synchronous poll signal PL1 of the H level and the second and third synchronous poll signals PL2 and PL3 of the L level, and outputs the output data RDO (D (1)) equivalent to the reception data RD3.

Next, the transmission circuit 12 outputs the poll signal PL of the H level in synchronization with a falling edge of the internal clock signal SCK (at time T31). Thereafter, the transmission circuit 12 outputs the transmission data D (2) in synchronization with a rising edge of the internal clock signal SCK (at time T32).

The flip-flop circuit 32 of the receiving circuit 13 outputs the reception poll signal PLE of the H level (at time T41) at a timing substantially equivalent to a timing (time T43) of generating the second reception enable signal EN2. Thus, the flip-flop circuit 33a outputs the synchronous poll signal PL1 of the L level (at time T43). The flip-flop circuit 33b outputs the synchronous poll signal PL2 of the H level (at time T44), and the flip-flop circuit 33c outputs the synchronous poll signal PL3 of the H level (at time T45).

The flip-flop circuit 35a outputs the reception data RD1 (D (1)) (at time T43). The flip-flop circuit 35b outputs the reception data RD2 (D (2)) (at time T44). The flip-flop circuit 35c outputs the reception data RD3 (D (2)) (at time T45).

The decoder 36 selects the third reception data RD3 based on the first synchronous poll signal PL1 of the L level and the second and third synchronous poll signals PL2 and PL3 of the H level, and outputs the output data RDO (D (2)) equivalent to the reception data RD3.

Accordingly, in Case 1, in response to the read request signal REQ, the receiving circuit 13 outputs the reception data D (1) at time T25, and outputs the reception data D (2) at time T45. That is, the receiving circuit 13 continuously outputs the reception data D (1) and D (2) in a cycle corresponding to the generation timing of the read request signal REQ.

[Case 2]

Figure 9:
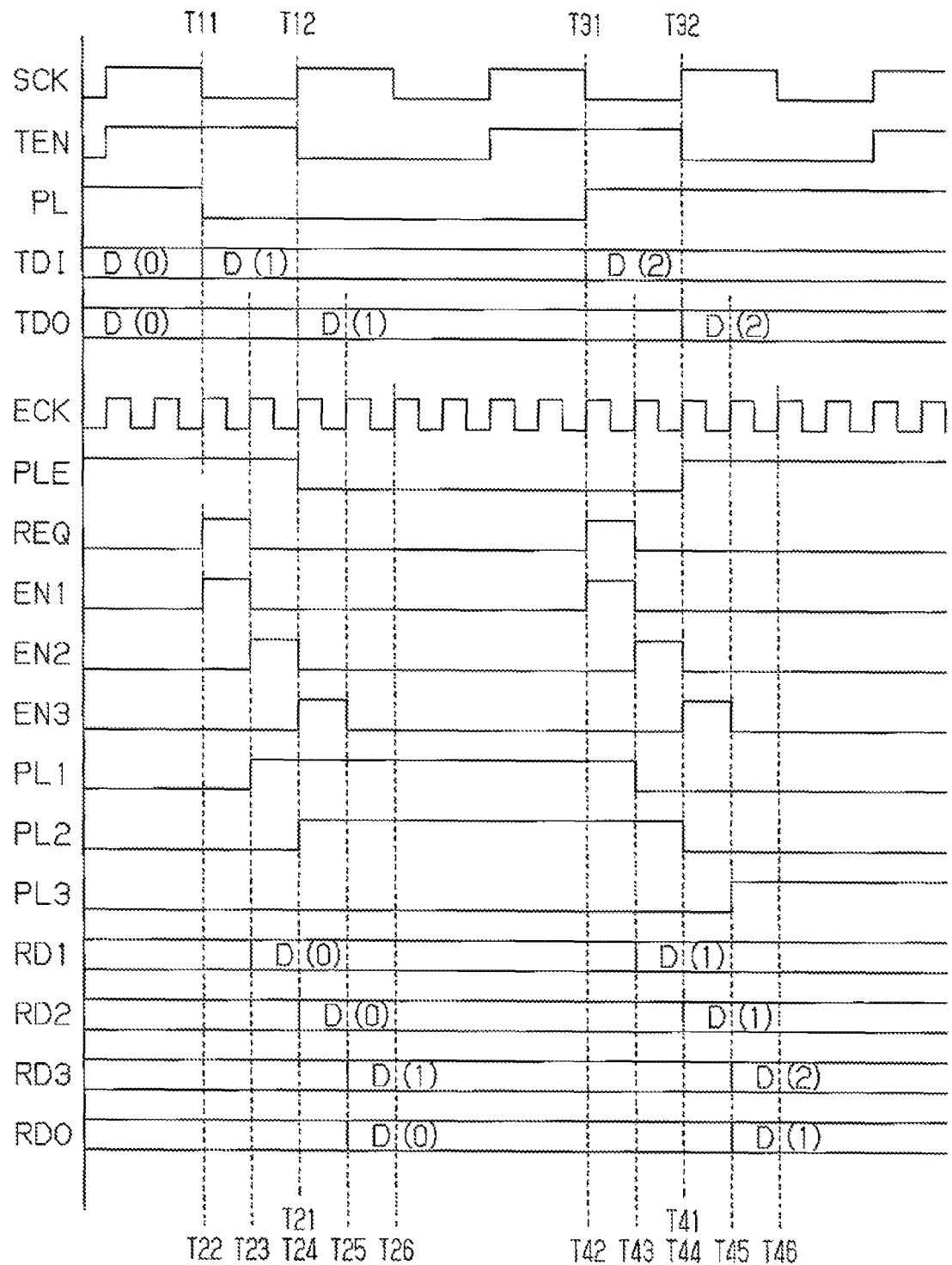

As illustrated in FIG. 9, the transmission circuit 12 outputs the transmission data D (0). The transmission circuit 12 outputs the poll signal PL of the L level in synchronization with a falling edge of the internal clock signal SCK (at time T11), and next outputs the transmission data D (1) in synchronization with a rising edge of the internal clock signal SCK (at time T12).

The enable signal generating circuit 34 of the receiving circuit 13 receives the read request signal REQ (at time T22) and generates the first reception enable signal EN1 (at time T22). Next, the enable signal generating circuit 34 generates the second reception enable signal EN2 in synchronization with the external clock signal ECK (at time T23), and next generates the third reception enable signal EN3 in synchronization with the external clock signal ECK (at time T24).

At time T21 after reception of the read request signal REQ (at time T22), the flip-flop circuit 32 of the receiving circuit 13 outputs the reception poll signal PLE of the L level based on the poll signal PL of the L level. In FIG. 9, time T21 is equivalent to time T24 of generating the third reception enable signal EN3.

The flip-flop circuit 33a outputs the synchronous poll signal PL1 of the H level in response to the first reception enable signal EN1 (at time T23). Next, the flip-flop circuit 33b outputs the synchronous poll signal PL2 of the H level in response to the second reception enable signal EN2 (at time T24), and next the flip-flop circuit 33c outputs the synchronous poll signal PL3 of the L level in response to the third reception enable signal EN3 (at time T25).

The flip-flop circuit 35a, in response to the first reception enable signal EN1, latches the transmission data D (0) in synchronization with the external clock signal ECK and outputs the reception data RD1 (D (0)) (at time T23). Similarly, the flip-flop circuit 35b outputs the reception data RD2 (D (0)) in synchronization with the external clock signal ECK in response to the second reception enable signal EN2 (at time T24). Next, the flip-flop circuit 35c outputs the reception data RD3 (D (1)) in synchronization with the external clock signal ECK in response to the third reception enable signal EN3 (at time T25).

The decoder 36 selects the first reception data RD1 based on the first and second synchronous poll signals PL1 and PL2 of the H level and the third synchronous poll signal PL3 of the L level, and outputs the output data RDO (D (0)) equivalent to the reception data RD1.

Next, the transmission circuit 12 outputs the poll signal PL of the H level (at time T31), and next outputs the transmission data D (2) (at time T32).

The flip-flop circuit 32 of the receiving circuit 13 outputs the reception poll signal PLE of the H level (at time T41) at a timing substantially equivalent to a timing (time T44) of generating the third reception enable signal EN3. Thus, the flip-flop circuit 33a outputs the synchronous poll signal PL1 of the L level (at time T43). The flip-flop circuit 33b outputs the synchronous poll signal PL2 of the L level (at time T44), and the flip-flop circuit 33c outputs the synchronous poll signal PL3 of the H level (at time T45).

The flip-flop circuit 35a outputs the reception data RD1 (D (1)) (at time T43). The flip-flop circuit 35b outputs the reception data RD2 (D (1)) (at time T44). The flip-flop circuit 35c outputs the reception data RD3 (D (2)) (at time T45).

The decoder 36 selects the first reception data RD1 based on the first and second synchronous poll signals PL1 and PL2 of the L level and the third synchronous poll signal PL3 of the H level, and outputs the output data RDO (D (1)) equivalent to the reception data RD1.

Accordingly, in Case 2, in response to the read request signal REQ, the receiving circuit 13 outputs the reception data D (0) at time T25, and outputs the reception data D (1) at time T45. That is, the receiving circuit 13 continuously outputs the reception data D (0) and D (1) in a cycle corresponding to the generation timing of the read request signal REQ.

[Case 3]

Figure 10:
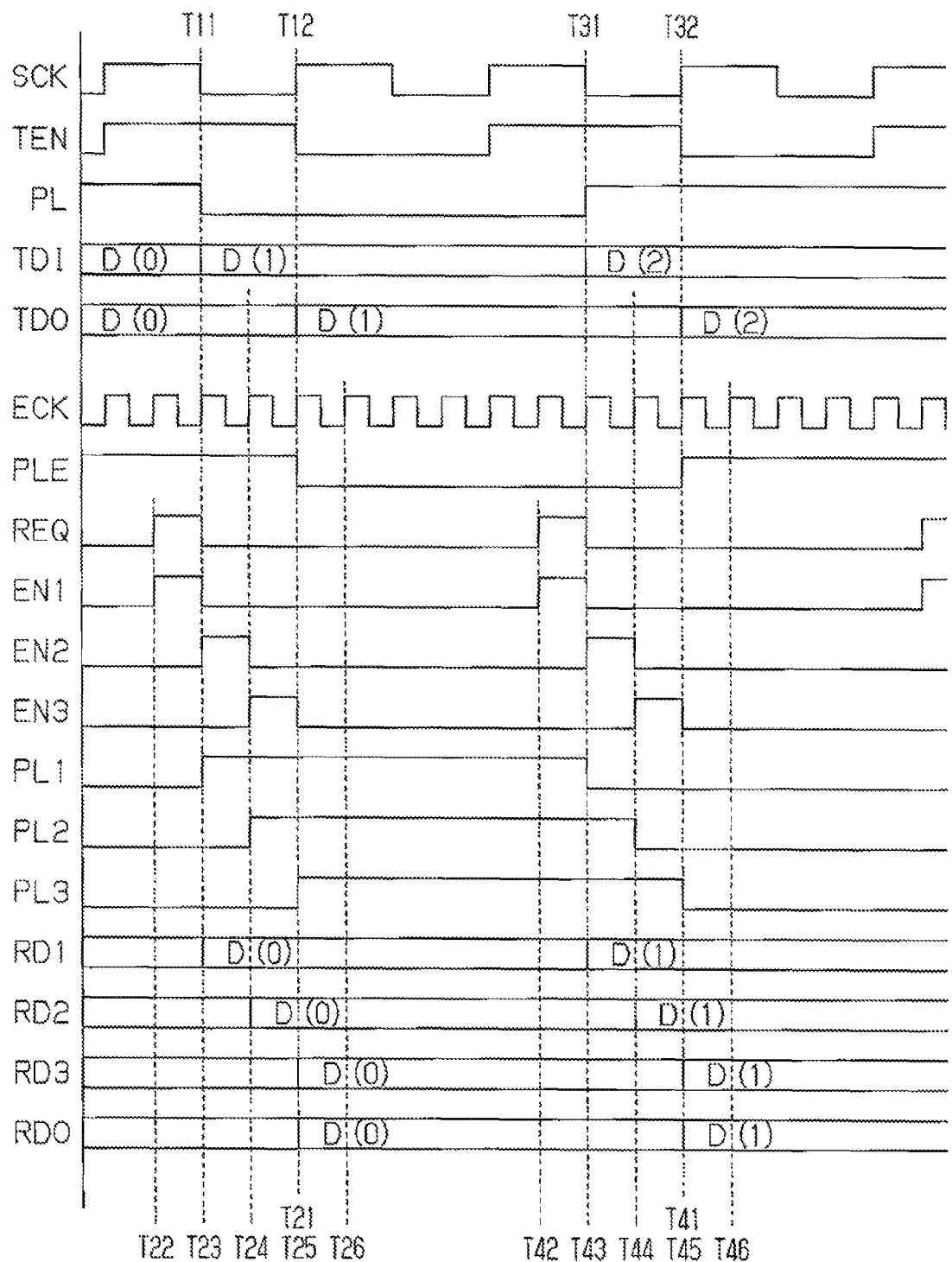

As illustrated in FIG. 10, the transmission circuit 12 outputs the transmission data D (0). The transmission circuit 12 outputs the poll signal PL of the L level in synchronization with a falling edge of the internal clock signal SCK (at time T11), and outputs the transmission data D (1) in synchronization with a rising edge of the internal clock signal SCK (at time T12).

The enable signal generating circuit 34 of the receiving circuit 13 receives the read request signal REQ (at time T22) and generates the first reception enable signal EN1 (at time T22). Next, the enable signal generating circuit 34 generates the second reception enable signal EN2 in synchronization with the external clock signal ECK (at time T23), and next generates the third reception enable signal EN3 in synchronization with the external clock signal ECK (at time T24).

At time T21 that is after reception (at time T22) of the read request signal REQ, the flip-flop circuit 32 of the receiving circuit 13 outputs the reception poll signal PLE of the L level based on the poll signal PL of the L level. In FIG. 10, time T21 is equivalent to time T25 that is after generation of the third reception enable signal EN3.

The flip-flop circuit 33a outputs the synchronous poll signal PL1 of the H level in response to the first reception enable signal EN1 (at time T23). Next, the flip-flop circuit 33b outputs the synchronous poll signal PL2 of the H level in response to the second reception enable signal EN2 (at time T24). Next, the flip-flop circuit 33c outputs the synchronous poll signal PL3 of the H level in response to the third reception enable signal EN3 (at time T25).

The flip-flop circuit 35a, in response to the first reception enable signal EN1, latches the transmission data D (0) in synchronization with the external clock signal ECK and outputs the reception data RD1 (D (0)) (at time T23). Similarly, the flip-flop circuit 35b outputs the reception data RD2 (D (0)) in synchronization with the external clock signal ECK in response to the second reception enable signal EN2 (at time T24). Next, the flip-flop circuit 35c outputs the reception data RD3 (D (0)) in synchronization with the external clock signal ECK in response to the third reception enable signal EN3 (at time T25).

The decoder 36 selects the second reception data RD2 based on the first to third synchronous poll signals PL1 to PL3 of the H level, and outputs the output data RDO (D (0)) equivalent to the reception data RD2.

Next, the transmission circuit 12 outputs the poll signal PL of the H level (at time T31), and next outputs the transmission data D (2) (at time T32).

The flip-flop circuit 32 of the receiving circuit 13 outputs the reception poll signal PLE of the L level (at time T41) at a timing substantially equivalent to a timing (time T45) that is after generation of the third reception enable signal EN3. Thus, the flip-flop circuit 33a outputs the synchronous poll signal PL1 of the L level (at time T43). The flip-flop circuit 33b outputs the synchronous poll signal PL2 of the L level (at time T44), and the flip-flop circuit 33c outputs the synchronous poll signal PL3 of the L level (at time T45).

The flip-flop circuit 35a outputs the reception data RD1 (D (1)) (at time T43). The flip-flop circuit 35b outputs the reception data RD2 (D (1)) (at time T44). The flip-flop circuit 35c outputs the reception data RD3 (D (1)) (at time T45).

The decoder 36 selects the second reception data RD2 based on the first to third synchronous poll signals PL1 to PL3 of the L level, and outputs the output data RDO (D (1)) equivalent to the reception data RD2.

Accordingly, in Case 3, in response to the read request signal REQ, the receiving circuit 13 outputs the reception data D (0) at time T25, and outputs the reception data D (1) at time T45. That is, the receiving circuit 13 continuously outputs the reception data D (0) and D (1) in a cycle corresponding to the generation timing of the read request signal REQ.

[Case 4]

Each of the flip-flop circuits 35a to 35c illustrated in FIG. 2 is capable of latching the transmission data TDO of 8 bits, for example. That is, each of the flip-flop circuits 35a to 35c includes eight flip-flops corresponding to the 8 bits of the transmission data TDO. In this case, bits of the transmission data TDO are respectively supplied to the corresponding flip-flops via different wirings. Therefore, delay times of 8-bit signals of the transmission data TDO, that is, timings when the levels at input terminals of eight flip-flops change, may differ from each other. In such a case, data that are latched in the flip-flops are different.

Figure 11:
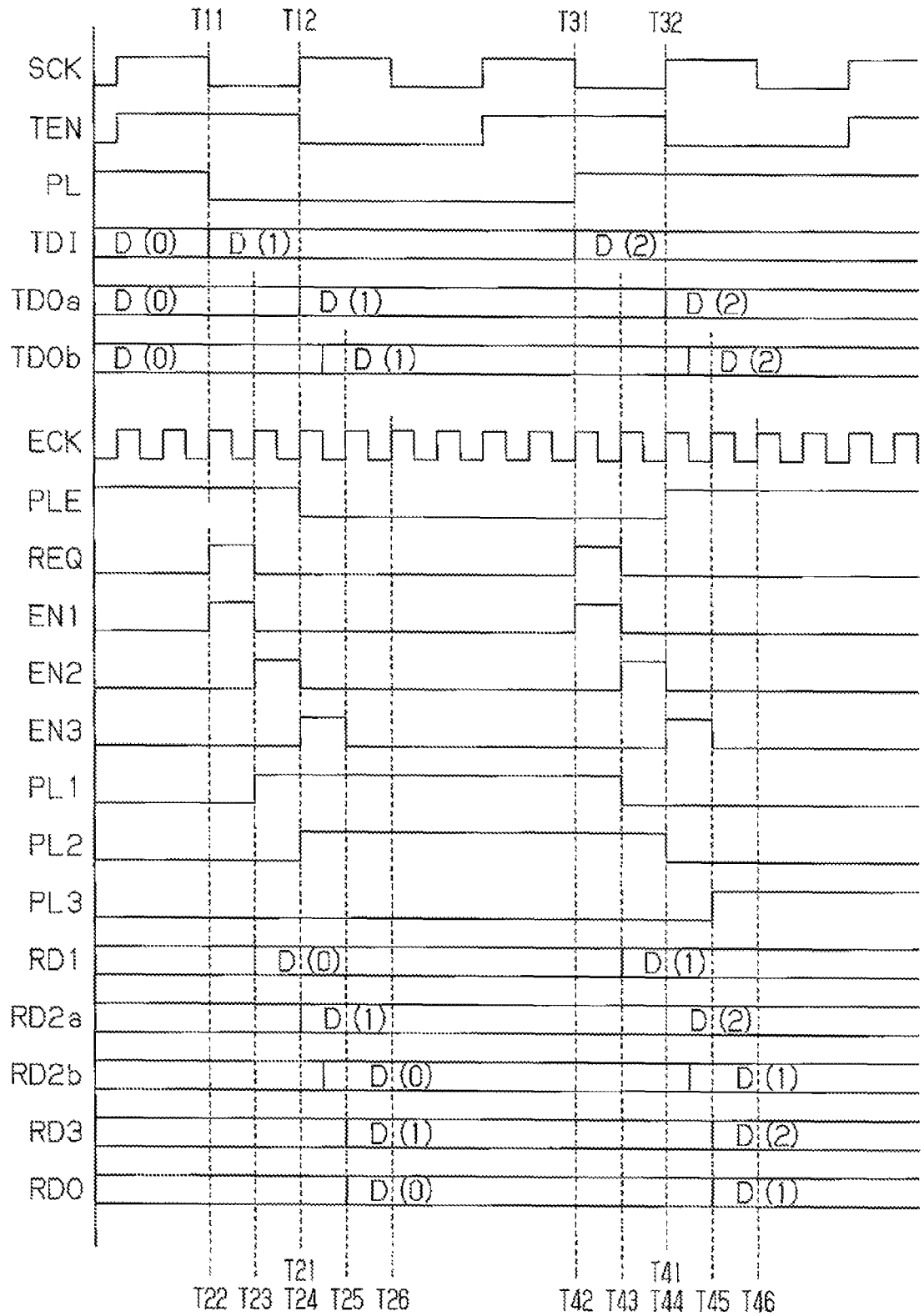

For example, as illustrated in FIG. 11, a transition timing of transmission data TDOa corresponding to high-order four bits of the data TDI and a transition timing of transmission data TDOb corresponding to low-order four bits of the data TDI are different. In FIG. 11, the transition timings of the transmission data TDOa and TDOb indicate timings when signal levels change at the input terminals IN of the flip-flop circuits 35a to 35c of the receiving circuit 13 illustrated in FIG. 2.

The flip-flop circuit 35b outputs the second reception data RD2. The second reception data RD2 includes reception data RD2a, which corresponds to the high-order four bits, and reception data RD2b, which corresponds to the low-order four bits. In the flip-flop circuit 35b, in response to the second reception enable signal EN2, four flip-flops corresponding to the high-order four bits latch the transmission data TDOa (D (1)) in synchronization with the external clock signal ECK and output the reception data RD2a (D (1)) (at time T24). Further, in the flip-flop circuit 35b, in response to the second reception enable signal EN2, four flip-flops corresponding to the low-order four bits latch the transmission data TDOb (D (0)) in synchronization with the external clock signal ECK and output the reception data RD2b (D (0)) (at time T24).

The flip-flop circuit 35a, in response to the first reception enable signal EN1, latches the transmission data D (0) in synchronization with the external clock signal ECK and outputs the reception data RD1 (D (0)) (at time T23). The flip-flop circuit 35c, in response to the third reception enable signal EN3, latches the transmission data D (1) in synchronization with the external clock signal ECK and outputs the reception data RD3 (D (1)) (at time T25).

In Case 4, the flip-flop circuit 32 of the receiving circuit 13 outputs the reception poll signal PLE of the H level (at time T21) at a timing substantially equivalent to a timing (time T24) of generating the third reception enable signal EN3. Thus, the flip-flop circuit 33a outputs the synchronous poll signal PL1 of the H level (at time T23). The flip-flop circuit 33b outputs the synchronous poll signal PL2 of the H level (at time T24), and the flip-flop circuit 33c outputs the synchronous poll signal PL3 of the L level (at time T25).

Thus, the decoder 36 selects the first reception data RD1 based on the first and second synchronous poll signals PL1 and PL2 of the H level and the third synchronous poll signal PL3 of the L level, and outputs the output data RDO (D (0)) equivalent to the reception data RD1.

Next, the transmission circuit 12 outputs the poll signal PL of the H level (at time T31), and next outputs the transmission data D (2) (at time T32).

In a similar manner, in the flip-flop circuit 35b, the four flip-flops corresponding to the high-order four bits latch the transmission data TDOa (D (2)) in synchronization with the external clock signal ECK and output the reception data RD2a (D (2)) (at time T44). Further, in the flip-flop circuit 35b, the four flip-flops corresponding to the low-order four bits latch the transmission data TDOb (D (1)) in synchronization with the external clock signal ECK and output the reception data RD2b (D (1)) (at time T44).

The flip-flop circuit 35a outputs the reception data RD1 (D (1)) in synchronization with the external clock signal ECK (at time T43). The flip-flop circuit 35c outputs the reception data RD3 (D (2)) in synchronization with the external clock signal ECK (at time T45).

The flip-flop circuit 32 of the receiving circuit 13 outputs the reception poll signal PLE of the H level (at time T41) at a timing substantially equivalent to a timing (time T44) of generating the third reception enable signal EN3. Thus, the flip-flop circuit 33a outputs the synchronous poll signal PL1 of the L level (at time T43). The flip-flop circuit 33b outputs the synchronous poll signal PL2 of the L level (at time T44), and the flip-flop circuit 33c outputs the synchronous poll signal PL3 of the H level (at time T45).

The decoder 36 selects the first reception data RD1 based on the first and second synchronous poll signals PL1 and PL2 of the L level and the third synchronous poll signal PL3 of the H level, and outputs the output data RDO (D (1)) equivalent to the reception data RD1.

Accordingly, in Case 4, in response to the read request signal REQ, the receiving circuit 13 outputs the reception data D (0) at time T25 and outputs the reception data D (1) at time T45. That is, the receiving circuit 13 continuously outputs the reception data D (0) and D (1) in a cycle corresponding to the generation timing of the read request signal REQ.

In FIGS. 7 to 11 used in the above explanation, waveforms are drawn as if the edge of the internal clock signal SCK and the edge of the external clock signal ECK match in time. However, even when the edge of the internal clock signal SCK and the edge of the external clock signal ECK do not match in time, the receiving circuit 13 may also continuously transfer data by operating in a similar manner to that explained above.

Figure 12:
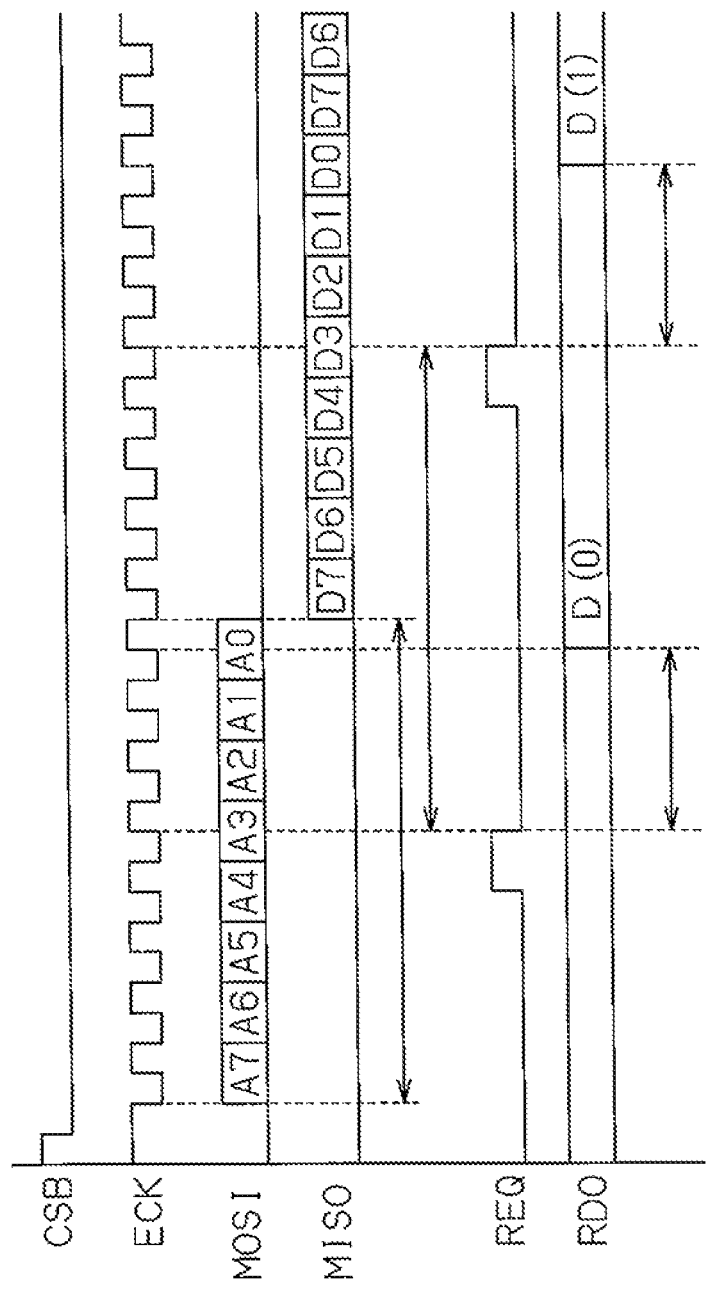
FIG. 12 is a timing diagram of external data transfer.

As described above, the receiving circuit 13 outputs the reception data RDO in response to the read request signal REQ that is output from the external interface 14 illustrated in FIG. 1. As illustrated in FIG. 12, the external interface 14 transmits the reception data RDO to an external device by a serial communication synchronous with the external clock signal ECK.

For example, when a selection signal CSB falls to the L level and the external interface 14 is selected by a data line MOSI, the external interface 14 drives a data line MISO in accordance with the reception data RDO. In this case, the data line MOSI of the external interface 14 is driven by a master in synchronization with a synchronous clock signal (the external clock signal ECK in the present embodiment) that is used by all devices that transmit and receive with each other by a serial communication.

As described above, the receiving circuit 13 outputs the data RDO after three cycle times of the external clock signal ECK from issuance of the read request signal REQ. Therefore, the external interface 14 may transfer the serial data SD based on the data RD even when the read request signal REQ is issued after four cycle times from start of communication.

In this case, even when the data TDI is updated by the internal circuit 11 after issuance of the read request signal REQ, the receiving circuit 13 receives the transmission data TDO based on the data TDI. Therefore, latest data may be transmitted to the outside.

The present embodiment has (among other things) the following advantages.

(1) The transmission circuit 12 inverts a level of the poll signal PL at each time of outputting the data TDO. The receiving circuit 13, in response to the read request signal REQ, receives the poll signal PL at plural timings and also receives the transmission data TDO at plural timings. Then, based on the poll signals that are received at the different timings, the receiving circuit 13 outputs the reception data RDO that is equivalent to one of sets of transmission data TDO that are received. Thus, the transmission circuit 12 and the receiving circuit 13 may asynchronously transfer data without mutually performing handshake.

(2) To securely receive by the receiving circuit 13 the transmission data TDO that is output from the transmission circuit 12, the transmission circuit 13 latches the next data TDI in the flip-flop circuit 21 in synchronization with the internal clock signal SCK. Therefore, continuous data may be transferred without interrupting output of the transmission data TDI to the internal circuit 11.

(3) A register and the like to latch data are not necessary to be provided in the transmission circuit 12 to securely receive by the receiving circuit 13 the transmission data TDO that is output from the transmission circuit 12. Therefore, increase of a circuit scale of the transmission circuit 12 may be suppressed.

(4) The decoder 36 selects the second reception data RD2 when levels of the synchronous poll signals PL1 to PL3 are equal to each other. This is because a level of the reception data RD2 obtained by latching the transmission data TDO at a center timing among three continuous timings is most stable. When levels of two of the synchronous poll signals PL1 to PL3 are different from the other signal level, the decoder 36 selects the reception data corresponding to the synchronous poll signal that is farthest in time from a transition timing of the reception poll signal PLE. This is because in this case, a level of the reception data obtained by latching the data TDO at a timing farthest from a timing when the transmission data TDO from the transmission circuit 12 changes is most stable. Accordingly, data may be transferred securely by optimizing selection of the reception data.

(5) The flip-flop circuit 31 of the receiving circuit 13 latches the poll signal PL, which is output from the transmission circuit 12, in synchronization with the external clock signal ECK. The flip-flop circuit 32, which is coupled in series with the flip-flop circuit 31, latches the output signal of the flip-flop circuit 31 in synchronization with the external clock signal ECK, and outputs the reception poll signal PLE.

In the flip-flop circuit that latches a signal by a clock signal, there is a case where metastability occurs when both timings of a setup time and a hold time are not satisfied. By coupling in series two flip-flop circuits that operate by the same clock signal, the poll signal PL may be received while reducing an influence of the metastability.

(6) In the receiving circuit 13, the flip-flop circuits 35a to 35c generate the first to third reception data RD1 to RD3 by latching the transmission data TDI of the transmission circuit 12 based on the first to third reception enable signals EN1 to EN3 that are generated at different timings. Metastability occurs in an output signal of a flip-flop circuit in an asynchronous circuit or the like of which a hold time or the like is not satisfied. In the present embodiment, reception data that is obtained by latching the transmission data RDO at a timing farthest from a timing when the transmission data TDO from the transmission circuit 12 changes is selected. Thus, reception data that has a stable level may be obtained without considering occurrence of metastability. Further, increase of a chip area may be suppressed as compared with that in a device that has a configuration of coping with metastability.

It should be apparent to those skilled in the art that the aforementioned embodiments may be embodied in many other forms without departing from the scope of the invention. Particularly, it should be understood that the aforementioned embodiments may be embodied in the following forms.

The semiconductor device 10 illustrated in FIG. 1 is an example of a device that includes the transmission circuit 12 and the receiving circuit 13, and the semiconductor device is not limited to the configuration of FIG. 1 as long as the semiconductor device includes the transmission circuit 12 and the receiving circuit 13. For example, in the above embodiment, although the semiconductor device 10 cyclically outputs the data SD, the transmission circuit 12 and the receiving circuit 13 may be applied to a semiconductor device that outputs data at random times.

Although the receiving circuit 13 of the above embodiment generates the reception enable signals EN1 to EN3 in response to the read request signal REQ, the receiving circuit 13 may generate the reception enable signals EN1 to EN3 based on other signals. For example, the enable signal generating circuit of the receiving circuit may sequentially generate the reception enable signals EN1 to EN3 based on output signals of circuits that cyclically generate signals such as a timer circuit and a counter circuit. In this configuration, the receiving circuit 13 that asynchronously operates with the transmission circuit 12 may also securely receive the output data TDO of the transmission circuit 12.

In the above embodiment, the number of the flip-flop circuits that receive the poll signal PL and generate the reception poll signal PLE may be suitably changed.

In the above embodiment, the configuration of the enable signal generating circuit 34 illustrated in FIG. 3 may be suitably changed. For example, when the read request signal REQ is not synchronous with the external clock signal ECK, the enable signal generating circuit may be formed by three flip-flop circuits that are coupled in series. In this configuration, a first-stage flip-flop circuit generates the first reception enable signal EN1 by latching the read request signal REQ. A second-stage flip-flop circuit generates the second reception enable signal EN2 by latching the first reception enable signal EN1. A third-stage flip-flop circuit generates the third reception enable signal EN3 by latching the second reception enable signal EN2.

In the above embodiment, timings when the receiving circuit 13 receives the transmission data TDO are not limited to three, and the number of the timings may be suitably changed.

In the above embodiment, although the frequency of the external clock signal ECK is set an integer times of the frequency of the internal clock signal SCK, the frequency of the external clock signal ECK may be suitably changed.

All examples and conditional language recited herein are intended for pedagogical purposes to aid the reader in understanding the principles of the invention and the concepts contributed by the inventor to furthering the art, and are to be construed as being without limitation to such recited examples and conditions, nor does the organization of such examples in the specification relate to an illustration of the superiority and inferiority of the invention. Although the embodiment(s) of the present invention(s) has (have) been described in detail, it should be understood that the various changes, substitutions, and alterations could be made hereto without departing from the spirit and scope of the invention.

The invention claimed is:

1. A data transfer system comprising:
   a transmission circuit configured to operate by a first clock signal; and
   a receiving circuit configured to operate by a second clock signal different from the first clock signal, wherein
   the transmission circuit includes an output circuit configured to output a poll signal,
   the output circuit logically inverts a level of the poll signal in accordance with a transmission timing of transmission data from the transmission circuit to the receiving circuit, and
   the receiving circuit includes
      a first signal generating circuit configured to receive the transmission data at a plurality of timings and generates a plurality of sets of reception data respectively corresponding to the plurality of timings,
      a second signal generating circuit configured to receive the poll signal at the plurality of timings and generates a plurality of synchronous poll signals respectively corresponding to the plurality of timings, and
      a data selecting circuit configured to compare levels of the plurality of synchronous poll signals with each other and selects one of the plurality of sets of reception data in accordance with a result of the comparison.

2. The data transfer system according to claim 1, wherein
   the first signal generating circuit generates first reception data, second reception data, and third reception data respectively corresponding to different three timings, and
   the second signal generating circuit generates a first synchronous poll signal, a second synchronous poll signal, and a third synchronous poll signal respectively corresponding to the different three timings.

3. The data transfer system according to claim 2, wherein
   the data selecting circuit selects the second reception data when levels of the first to third synchronous poll signals are equal to each other,
   the data selecting circuit selects the third reception data when a level of the first synchronous poll signal is different from a level of the second synchronous poll signal and a level of the third synchronous poll signal, and
   the data selecting circuit selects the first reception data when a level of the third synchronous poll signal is different from a level of the first synchronous poll signal and a level of the second synchronous poll signal.

4. The data transfer system according to claim 1, wherein
   the receiving circuit includes a plurality of flip-flop circuits that are coupled in series and receive the second clock signal,
   the poll signal is supplied to a first-stage flip-flop circuit of the plurality of flip-flop circuits, and
   the second signal generating circuit generates the plurality of synchronous poll signals by latching at the plurality of timings a synchronous poll signal that is output from a last-stage flip-flop circuit of the plurality of flip-flop circuits.

5. The data transfer system according to claim 1, further comprising
   an enable signal generating circuit configured to generate a plurality of reception enable signals respectively corresponding to the plurality of timings based on a timing signal that is repeatedly output in a given cycle, wherein
   the first signal generating circuit generates the plurality of sets of reception data respectively based on the plurality of reception enable signals, and
   the second signal generating circuit generates the plurality of synchronous poll signals respectively based on the plurality of reception enable signals.

6. The data transfer system according to claim 5, wherein
   the enable signal generating circuit generates a first reception enable signal, a second reception enable signal, and a third reception enable signal as the plurality of reception enable signals, and
   the first signal generating circuit includes
   a first flip-flop circuit that includes an enable terminal which receives the first reception enable signal, a clock terminal which receives the second clock signal, and an input terminal which receives the transmission data, wherein the first flip-flop circuit generates first reception data,
   a second flip-flop circuit that includes an enable terminal which receives the second reception enable signal, a clock terminal which receives the second clock signal, and an input terminal which receives the transmission data, wherein the second flip-flop circuit generates second reception data, and
   a third flip-flop circuit that includes an enable terminal which receives the third reception enable signal, a clock terminal which receives the second clock signal, and an input terminal which receives the transmission data, wherein the third flip-flop circuit generates third reception data.

7. The data transfer system according to claim 5, wherein
   the enable signal generating circuit generates a first reception enable signal, a second reception enable signal, and a third reception enable signal as the plurality of reception enable signals, and
   the second signal generating circuit includes
   a first flip-flop circuit that includes an enable terminal which receives the first reception enable signal, and a clock terminal which receives the second clock signal, wherein the first flip-flop circuit generates a first synchronous poll signal,
   a second flip-flop circuit that includes an enable terminal which receives the second reception enable signal, and a clock terminal which receives the second clock signal, wherein the second flip-flop circuit generates a second synchronous poll signal, and
   a third flip-flop circuit that includes an enable terminal which receives the third reception enable signal, and a clock terminal which receives the second clock signal, wherein the third flip-flop circuit generates a third synchronous poll signal.

8. The data transfer system according to claim 1, wherein the transmission circuit includes a flip-flop circuit including an enable terminal which receives a transmission enable signal, wherein the flip-flop circuit latches data based on the first clock signal and generates the transmission data that is equivalent to the latched data.

9. A data transfer method comprising:
transmitting transmission data from a transmission circuit to a receiving circuit, wherein the transmission circuit operates by a first clock signal, and the receiving circuit operates by a second clock signal different from the first clock signal;
transmitting a poll signal from the transmission circuit to the receiving circuit;
logically inverting a level of the poll signal in accordance with a transmission timing of the transmission data;
receiving the transmission data at a plurality of timings;
generating a plurality of sets of reception data respectively corresponding to the plurality of timings;
receiving the poll signal at the plurality of timings;
generating a plurality of synchronous poll signals respectively corresponding to the plurality of timings;
comparing levels of the plurality of synchronous poll signals with each other; and
selecting one of the plurality of sets of reception data in accordance with a result of the comparison.

10. A receiving circuit comprising:
a first signal generating circuit configured to receive transmission data transmitted from a transmission circuit at a plurality of timings and generates a plurality of sets of reception data respectively corresponding to the plurality of timings;
a second signal generating circuit configured to receive at the plurality of timings a poll signal, wherein the poll signal is output from the transmission circuit and is logically inverted in accordance with a transmission timing of the transmission data, and the second signal generating circuit generates a plurality of synchronous poll signals respectively corresponding to the plurality of timings; and
a data selecting circuit configured to compare levels of the plurality of synchronous poll signals with each other and selects one of the plurality of sets of reception data in accordance with a result of the comparison.

11. A receiving method comprising:
receiving transmission data transmitted from a transmission circuit at a plurality of timings;
generating a plurality of sets of reception data respectively corresponding to the plurality of timings;
receiving at the plurality of timings a poll signal which is output from the transmission circuit and is logically inverted in accordance with a transmission timing of the transmission data;
generating a plurality of synchronous poll signals respectively corresponding to the plurality of timings;
comparing levels of the plurality of synchronous poll signals with each other; and
selecting one of the plurality of sets of reception data in accordance with a result of the comparison.

* * * * *